US012014913B2

(12) United States Patent
Privet et al.

(10) Patent No.: US 12,014,913 B2
(45) Date of Patent: Jun. 18, 2024

(54) REDUCING PLASMA FORMATION IN AN ION PUMP

(71) Applicant: Edwards Vacuum LLC, Sanborn, NY (US)

(72) Inventors: Evan Privet, Shakopee, MN (US); Marcus Hans Robert Thierley, Shakopee, MN (US)

(73) Assignee: Edwards Vacuum LLC, Sanborn, NY (US)

( * ) Notice: Subject to any disclaimer, the term of this patent is extended or adjusted under 35 U.S.C. 154(b) by 232 days.

(21) Appl. No.: 17/640,673

(22) PCT Filed: Sep. 4, 2020

(86) PCT No.: PCT/IB2020/058239
§ 371 (c)(1),
(2) Date: Mar. 4, 2022

(87) PCT Pub. No.: WO2021/044353
PCT Pub. Date: Mar. 11, 2021

(65) Prior Publication Data

US 2022/0328294 A1 Oct. 13, 2022

(30) Foreign Application Priority Data

Sep. 6, 2019 (GB) ...................................... 1912826

(51) Int. Cl.

| | |
|---|---|
| ***H01J 41/12*** | (2006.01) |
| ***F04B 37/02*** | (2006.01) |
| ***H01J 17/22*** | (2012.01) |
| ***H01J 17/24*** | (2012.01) |

(52) U.S. Cl.
CPC .............. *H01J 41/12* (2013.01); *F04B 37/02* (2013.01); *H01J 17/22* (2013.01); *H01J 17/24* (2013.01)

(58) Field of Classification Search
CPC . F04B 37/02; H01J 17/22; H01J 17/24; H01J 41/12
See application file for complete search history.

(56) References Cited

U.S. PATENT DOCUMENTS

| | | | | |
|---|---|---|---|---|
| 3,233,823 A | | 2/1966 | Asamaki | |
| 10,629,417 B1 * | | 4/2020 | Hughes ................ | G05B 19/048 |
| 11,569,077 B2 * | | 1/2023 | McBride ................. | H01J 41/00 |

FOREIGN PATENT DOCUMENTS

| | | |
|---|---|---|
| EP | 0337530 A2 | 10/1989 |
| EP | 3057121 A1 | 8/2016 |
| GB | 1001236 | 8/1965 |

(Continued)

OTHER PUBLICATIONS

PCT Notification of Transmittal of the International Search Report and the Written Opinion of the International Searching Authority, or the Declaration dated Nov. 6, 2020 and International Search Report dated Nov. 6, 2020 for corresponding PCT application Serial No. PCT/IB2020/058239, 5 pages.

(Continued)

*Primary Examiner* — Christopher S Bobish
(74) *Attorney, Agent, or Firm* — Theodore M. Magee; Westman, Champlin & Koehler, P.A.

(57) ABSTRACT

An ion pump controller configured to alternate between increasing and decreasing a potential difference between an anode and a cathode of an ion pump multiple times during the starting of pumping.

12 Claims, 4 Drawing Sheets

(56) References Cited

FOREIGN PATENT DOCUMENTS

| | | | |
|---|---|---|---|
| GB | 1129557 | | 10/1968 |
| GB | 2026231 | A | 1/1980 |
| JP | H0410347 | A | 1/1992 |
| WO | 9840532 | A1 | 9/1998 |

OTHER PUBLICATIONS

PCT Written Opinion dated Nov. 6, 2020 for corresponding PCT application Serial No. PCT/IB2020/058239, 9 pages.

British Examination Report dated Mar. 2, 2020 and Search Report dated Feb. 28, 2020 for corresponding British application Serial No. GB1912826.3, 7 pages.

Notification of Transmittal of the International Preliminary Report on Patentability dated Dec. 14, 2021 and Response dated Apr. 1, 2021 for corresponding PCT application Serial No. PCT/IB2020/058239, 20 pages.

* cited by examiner

REDUCING PLASMA FORMATION IN AN ION PUMP

CROSS-REFERENCE TO RELATED APPLICATION

This application is a Section 371 National Stage Application of International Application No. PCT/IB2020/058239, filed Sep. 4, 2020, and published as WO 2021/044353 A1 on Mar. 11, 2021, the content of which is hereby incorporated by reference in its entirety and which claims priority of British Application No. 1912826.3, filed Sep. 6, 2019.

BACKGROUND

Ultra-high vacuum is a vacuum regime characterized by pressures lower than 10-7 pascal (10-9 mbar, approximately 10-9 tor). Ion pumps are used in some settings to establish an ultra-high vacuum. In an ion pump, an array of cylindrical anode tubes are arranged between two cathode plates such that the openings of each tube faces one of the cathode plates. An electrical potential is applied between the anode and the cathode. At the same time, magnets on opposite sides of the cathode plates generate a magnetic field that is aligned with the axes of the anode cylinders.

The ion pump operates by trapping electrons within the cylindrical anodes through a combination of the electrical potential and the magnetic field comparable to a Penning cell setup. When a gas molecule drifts into one of the anodes, the trapped electrons strike the molecule causing the molecule to ionize. The resulting positively charged ion is accelerated by the electrical potential between the anode and the cathode toward one of the cathode plates leaving the stripped electron(s) in the cylindrical anode to be used for further ionization of other gas molecules. The positively charged ion is eventually trapped by the cathode and is thereby removed from the evacuated space. Typically, the positively charged ion is trapped through a sputtering event in which the positively charged ion causes material from the cathode to be sputtered into the vacuum chamber of the pump. This sputtered material coats surfaces within the pump and acts to trap additional particles moving within the pump.

The discussion above is merely provided for general background information and is not intended to be used as an aid in determining the scope of the claimed subject matter. The claimed subject matter is not limited to implementations that solve any or all disadvantages noted in the background.

SUMMARY

An ion pump controller is configured to alternate between increasing and decreasing a potential difference between an anode and a cathode of an ion pump multiple times during the starting of pumping.

In accordance with a further embodiment, a method of operating an ion pump includes increasing and decreasing a voltage between an anode and a cathode of the ion pump and then determining that a state of the ion pump has changed. In response to the change in the state, a steady-state voltage is applied between the anode and the cathode.

In accordance with a still further embodiment, an ion pump controller is configured to automatically alternate between providing power and not providing power to at least one of an anode and a cathode in an ion pump during startup.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
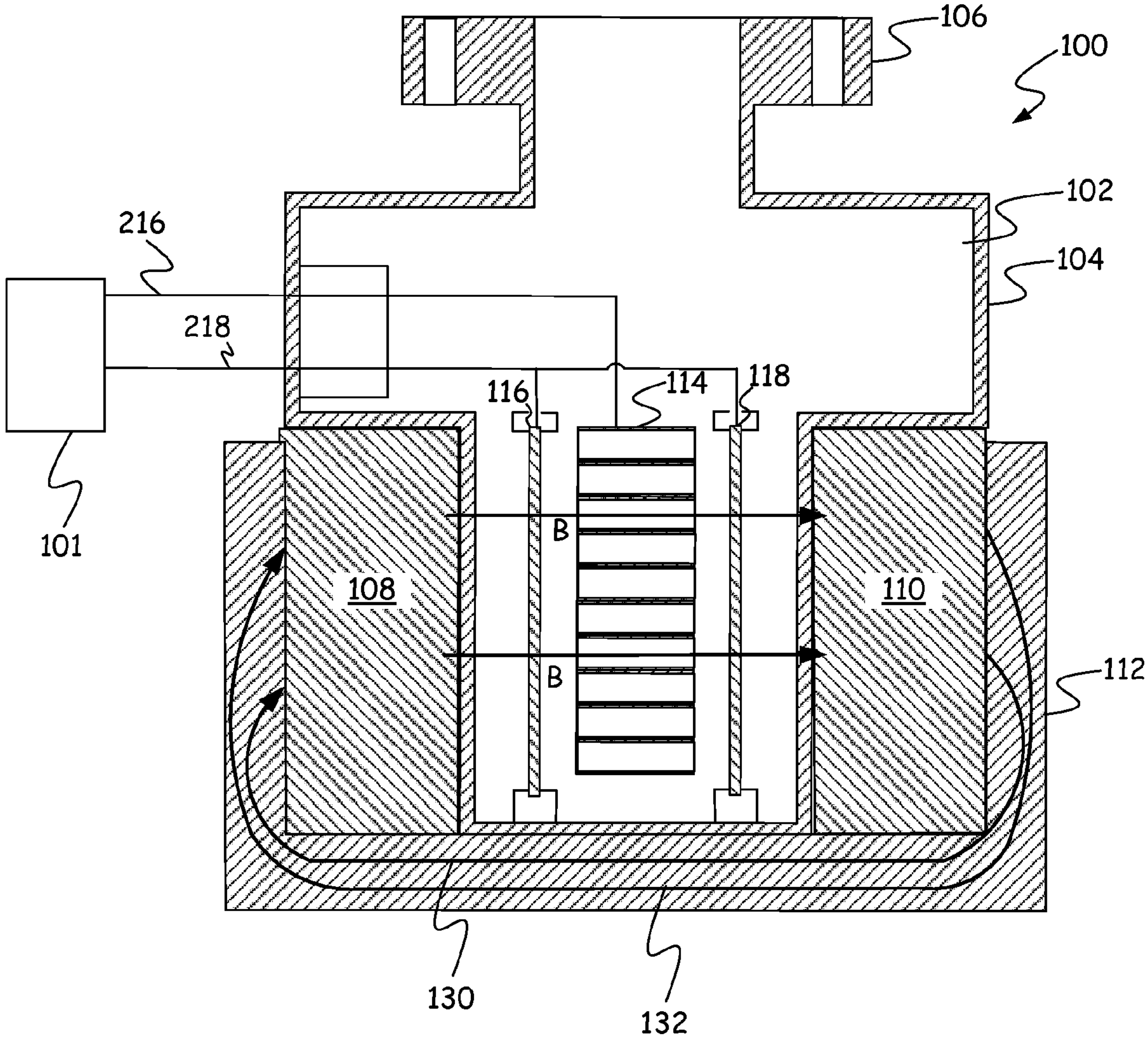
FIG. 1 provides a sectional view of an ion pump.

FIG. 1 provides a sectional view of an ion pump 100 attached to an ion pump controller 101 in accordance with one embodiment. Ion pump 100 includes a vacuum chamber 102 defined by a chamber wall 104 that is welded to a connection flange 106 for connection to a system to be evacuated. Two ferrite magnets 108 and 110 are located external to chamber wall 104 and are mounted on opposing sides of ion pump 100. A magnetic flux guide 112 is positioned on the outside of each of ferrite magnets 108 and 110 and extends below and/or on the sides of ion pump 100 to guide magnetic flux between the exteriors of each of the ferrite magnets 108 and 110 as shown by arrows 130 and 132. Ferrite magnets 108 and 110 produce a magnetic field B that passes through vacuum chamber 102.

Within vacuum chamber 102, an array of cylindrical anodes 114 is positioned between two cathode plates 116 and 118 such that the openings of the anode cylinders face the cathode plates.

The cylindrical anodes 114 and chamber wall 104 are maintained at a positive potential while cathode plates 116 and 118 are maintained at ground potential. In accordance with some embodiments, the potential difference between cathode plates 116 and 118 and cylindrical anodes 114 is 3-7 kV.

In operation, flange 106 is connected to a flange of a system to be evacuated. Once the flange is connected, particles within the system to be evacuated travel into vacuum chamber 102 and eventually move within the interior of one of the cylindrical anodes 114. The combination of the magnetic field B and the electrical potential between anodes 114 and cathode plates 116 and 118 cause electrons to be trapped within each of the cylindrical anodes 114. Although trapped within the cylindrical anodes 114, the electrons are in motion such that as particles enter a cylindrical anode 114, they are struck by the trapped electrons causing the particles to ionize. The resulting positively charged ions are accelerated by the potential difference between anodes 114 and the cathode plates 116 and 118 causing the positively charged ions to move from the interior of cylindrical anodes 114 toward one of the cathode plates 116 and 118. The ions strike cathode plates 116/118 causing material from cathode plates 116/118 to sputter away from the plates and causing the ion to become embedded in cathode plate 116/118.

Ion pump controller 101 provides and monitors the current and voltage applied to anodes 114 and cathode plates 116/118 through conductors 216 and 218. The measured current between anodes 114 and cathode plates 116/118 is used by ion pump controller 101 to calculate a pressure within vacuum chamber 102. In accordance with some embodiments, ion pump controller 101 includes a touch screen to accept control instructions and to display the status of ion pump 100 including the current and voltage between anodes 114 and cathode plates 116/118 and the pressure within vacuum chamber 102. Ion pump controller 101 also includes network communication interfaces for communicating with various computing devices. Such computing devices can send command signals to ion pump controller 101 to control the operation of pump 100 and can receive values from ion pump controller 101 representing the current state of ion pump controller 101 and ion pump 100.

Prior art ion pumps are difficult to start at pressures above $10^{-5}$ mbar. At such pressures, with high voltage applied, an intense plasma develops within the pump that conducts current between the cathode and anode. This limits the magnitude of the potential difference that can develop between the anode and cathode, which in turn limits the amount of sputtering that takes place. In addition, the formation of the intense plasma generates heat within the ion pump, which increases the pressure further. This increase in pressure allows the plasma to conduct more current thereby further limiting the magnitude of the voltage between the anode and the cathode in the pump.

Embodiments described herein, limit the formation of plasmas during ion pump startup so that less of the electrical power provided to the pump is wasted on heat generation. In particular, instead of constantly applying power between the anode and cathode, the embodiments apply pulses of supply voltage between the anode and cathode. Each pulse is sufficient to induce sputtering within the pump while preventing or at least limiting the formation of intense plasmas within the ion pump. While applying the pulses of power across the anode and cathode, the pump monitors a state of the ion pump, such as the voltage between the cathode and anode when power is being supplied to the pump. When the monitored state reaches a threshold level, power is continuously applied between the anode and cathode.

Figure 2:
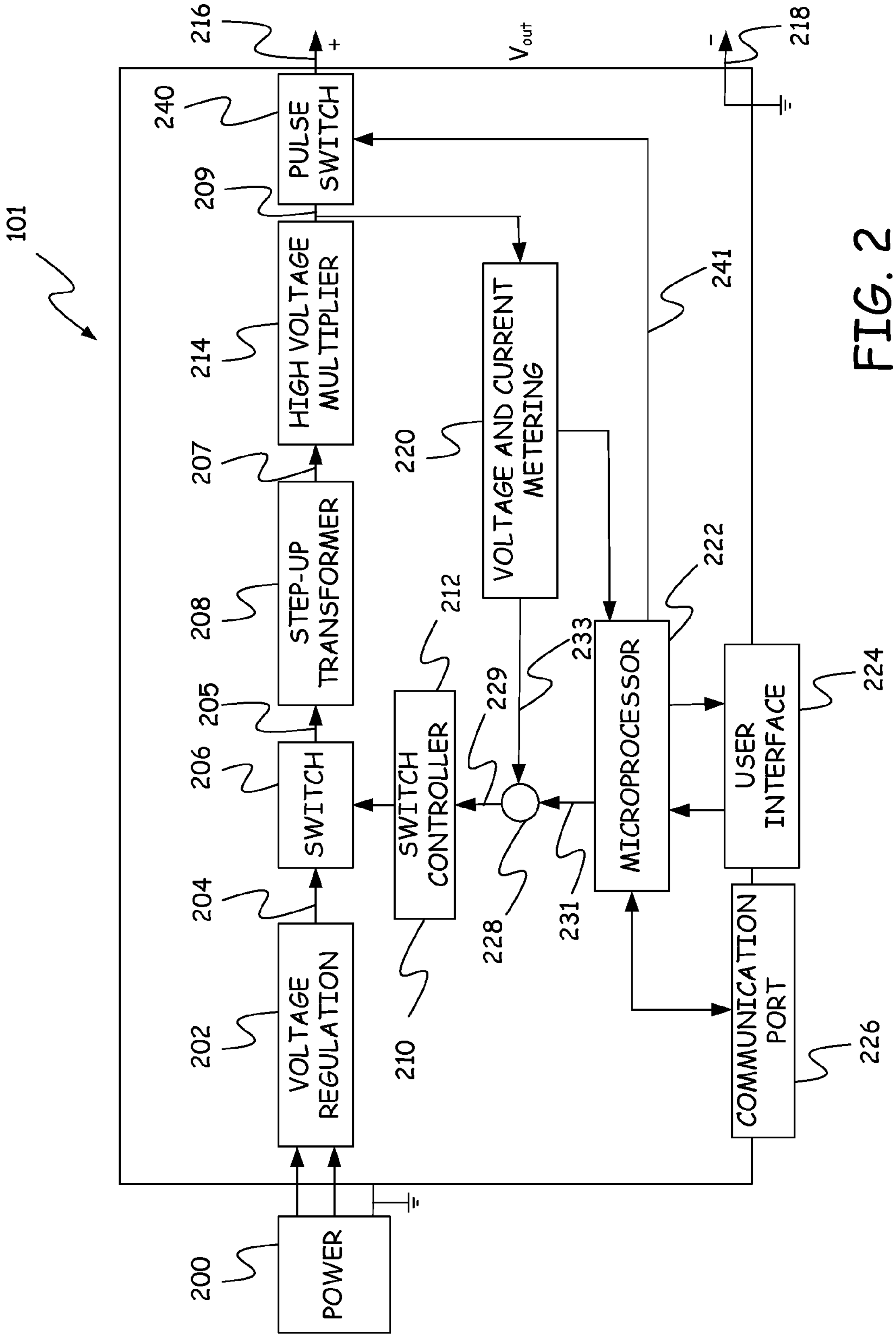
FIG. 2 provides a block diagram of a controller assembly in accordance with one embodiment.

FIG. 2 provides a circuit diagram of ion pump controller 101, in accordance with one embodiment. Ion pump controller 101, receives power from a power source 200. In accordance with the various embodiments, the power is 100-240 VAC while in other embodiments the power is 12 or 24 VDC. Ion pump controller 101 is also connected to ground via the same plug that connects ion pump controller 101 to power source 200.

The power from power 200 is provided to a voltage regulation unit 202, which provides regulated DC voltages to power the various circuits of ion pump controller 101. Voltage regulation unit 202 also provides a regulated DC voltage output 204 to a switch 206. Switch 206 consists of one or more solid-state switches such as power MOSFETs that are controlled by a control signal 210 from a switch controller 212. The output 205 of switch 206 is a pulsed signal that alternates between the voltage of regulated DC voltage output 204 and ground based on control signal 210.

Pulsed signal 205 is provided to step-up transformer 208, which increases the voltage to produce a high-voltage AC signal 207. High-voltage AC signal 207 is provided to high-voltage multiplier 214, which produces a DC power output 209 that has a no-load voltage that is a multiple of the magnitude of high-voltage AC signal 207.

DC power output 209 is connected to voltage and current metering 220, which measures the voltage and current of DC power output 209.

In accordance with one embodiment, the increase in voltage provided by step-up transformer 208 is based in part on the frequency and/or pulse width of the pulses in pulsed signal 205. As a result, switch controller 212 can change the voltage output by step-up transformer 208 by modifying the frequency and/or pulse width of pulsed signal 205. In accordance with one embodiment, switch controller 212 modifies the frequency and/or pulse width based on a difference 229 between a target voltage 231 for DC power output 209 provided by microprocessor 222 and a measured voltage 233 of DC power output 209 provided by voltage and current metering 220. In FIG. 2, this difference is shown as being produced by a separate summer 228 but in other embodiments the difference is determined within switch controller 212. When difference 229 indicates that measured voltage 233 is less than target voltage 231, switch controller 212 alters control signal 210 to adjust the switching of switch 206 such that the voltage on DC power output 209 increases. When difference 229 indicates that measured voltage 233 is more than target voltage 231, switch controller 212 alters control signal 210 to adjust the switching of switch 206 such that the voltage on DC power output 209 decreases.

As discussed further below, the voltage of DC power output 209 is pulsed when the pressure within the pump is above some threshold such as at pump startup. During such pulsing, switch controller 212 will either suspend adjusting the switching of switch 206 or will adjust the switching based only on the maximum voltage measured during each cycle of the pulsed DC power output 209.

Voltage and current metering 220 provides digital values representing the measured current and voltage of DC power output 209 to microprocessor 222 at regular intervals. Microprocessor 222 uses the current values to calculate pressures in pump chamber 102 and alters a graphic on user interface 224 to display the values of the current, voltage and pressure. Microprocessor 222 also receives instructions for starting and stopping ion pump 100 through user interface 224 and/or through a communication port 226.

Microprocessor 222 uses the measured voltage of DC power output 209 to control a pulse switch 240, which alternately connects and disconnects DC power output 209 to conductor 216. In accordance with one embodiment, pulse switch 240 is a physical relay while in other embodiments, switch 206 consists of one or more solid-state switches such as power MOSFETs and high-voltage insulated-gate bipolar transistors (IGBTs). In accordance with one embodiment, microprocessor 222 sets a control signal 241 to cause pulse switch 240 to disconnect DC power output 209 from conductor 216 when the voltage of DC power output 209 drops below a threshold voltage. After a period of time, microprocessor 222 alters control signal 241 to cause pulse switch 240 to reconnect DC power output 209 to conductor 216. These two steps are repeated resulting in voltage pulses on conductor 216 that help prevent the formation of intense plasmas when the pressure within the pump chamber is high, such as during pump startup. When the voltage on DC power output 209 no longer drops below the threshold voltage when pulse switch 240 is closed, microprocessor 222 sets control signal 241 to a constant value to maintain pulse switch 240 in the closed position.

Figure 3:
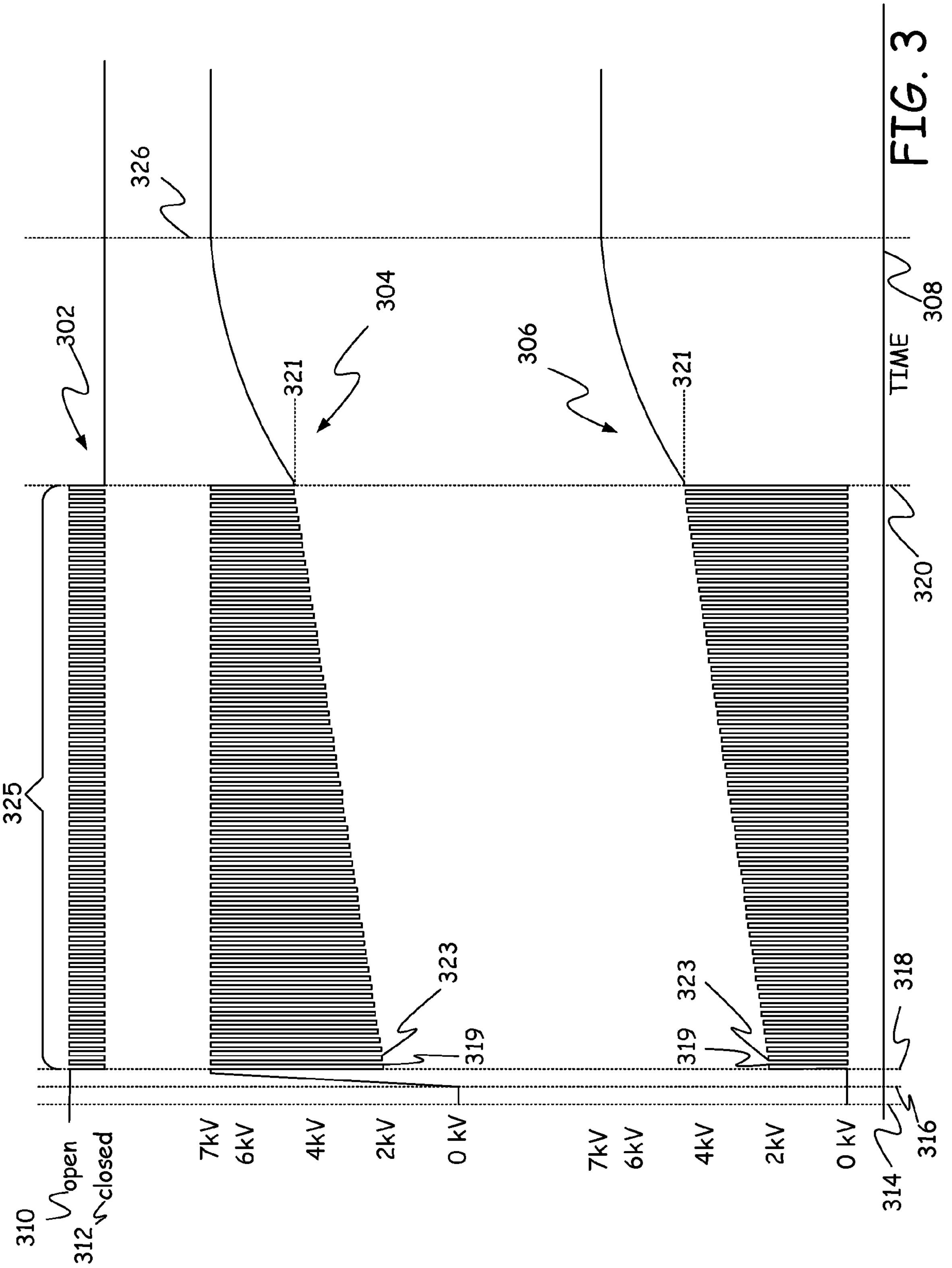
FIG. 3 provides graphs of a control signal, an output voltage and an anode-cathode voltage a common timeline.

FIG. 3 provides three graphs 302, 304 and 306 along a common timeline 308. Graph 302 represents control signal 241 and is shown to transition between an open state 310 and a closed state 312. Open state 310 represents the value for control signal 241 that cause pulse switch 240 to open so it does not connect DC power output 209 to conductor 216.

Closed state 312 represents a value for control signal 241 that causes pulse switch 240 to close so as to connect DC power output 209 to conductor 216. Graph 304 is a graph of the voltage on DC power output 209 and graph 306 is a graph of the voltage on conductor 216, which is also the potential difference between anodes 114 and cathode plates 116/118.

Figure 4:
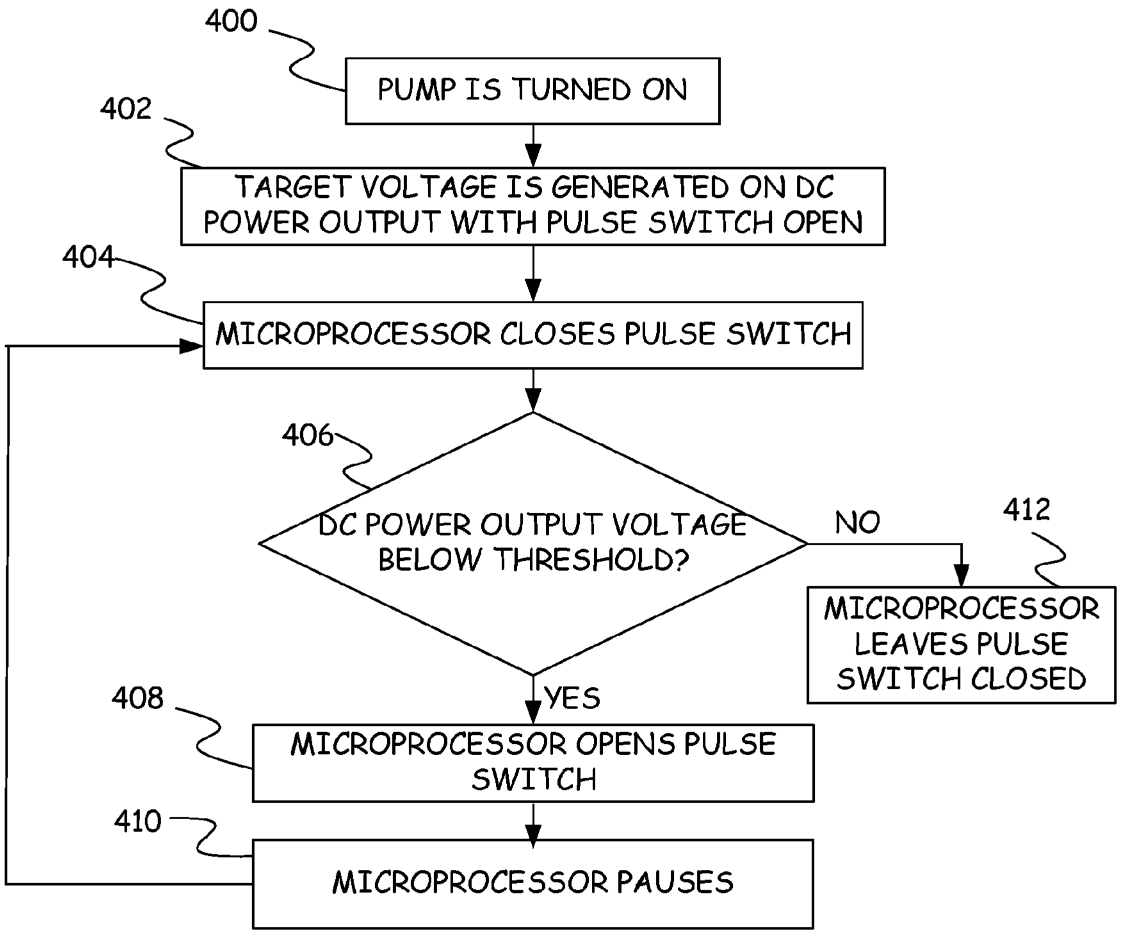
FIG. 4 provides a flow diagram of a method in accordance with various embodiments.

FIG. 4 provides a flow diagram of a method of starting an ion pump in accordance with one embodiment. Prior to the method of FIG. 4, such as at a time point 314 in FIG. 3, no power is being applied to the ion pump and the ion pump is considered to be off. At time point 316 of FIG. 3 and step 400 of FIG. 4, the pump is turned on by microprocessor 222 based on input received through user interface 224 and/or instructions received through communication port 226. At step 402, the target voltage is generated on DC power output 209 while microprocessor 222 issues a value on control signal 241 so that pulse switch 240 is open. Since pulse switch 240 is open, the voltage on DC power output 209 increases while the voltage on conductor 216 remains at ground/neutral.

When DC power output 209 reaches the target voltage, microprocessor 222 sends a value on control signal 241 to close pulse switch 240 at time point 318, step 404. This causes DC power output 209 to be connected to conductor 216 resulting in the voltage on DC power output 209 dropping and the voltage on conductor 216 increasing until DC power output 209 and conductor 216 reach a voltage 319. The magnitude of voltage 319 is controlled by how much current flows between anodes 114 and cathode plates 116/118 through the gas in chamber 102. In general, the current is higher for higher gas pressures in chamber 102. The current is associated with a flow of positive ions toward the cathode plate resulting in the capture of the ions at the cathode plate and/or sputtering which captures other particles in chamber 102. As a result, the increase in voltage on conductor 216 results in a decrease in the pressure in chamber 102.

At step 406, microprocessor 222 detects that voltage 319 of DC power output 209 is below threshold voltage 321 and in response, sends a value on control signal 241 to open pulse switch 240 at step 408. This breaks the connection between DC power output 209 and conductor 216 resulting in the voltage on DC power output 209 returning to the target voltage and the voltage on conductor 316 returning to ground/neutral.

At step 410, microprocessor 222 waits for a period of time, such as 0.5 seconds before returning to step 404 and reclosing pulse switch 240. When pulse switch 240 is reclosed, DC power output 209 is reconnected to conductor 216 resulting in the voltage on DC power output 209 dropping and the voltage on conductor 216 increasing until DC power output 209 and conductor 216 reach a voltage 323. Voltage 323 is greater than voltage 319 because the pressure in chamber 102 has been reduced by the voltage pulses on conductor 216 thereby reducing the current between anodes 114 and cathode plates 116/118.

At step 406, microprocessor 222 once again detects that voltage 323 of DC power output 209 is below threshold voltage 321 and in response, sends a value on control signal 241 to open pulse switch 240 at step 408. This breaks the connection between DC power output 209 and conductor 216 resulting in the voltage on DC power output 209 returning to the target voltage and the voltage on conductor 216 returning to ground/neutral. At step 410, microprocessor 222 once again waits for a period of time, such as 0.5 seconds before returning to step 404 and reclosing pulse switch 240.

Microprocessor 222 continues to repeat steps 404, 406, 408 and 410 resulting in a sequence of pulses on control signal 241 and corresponding sequences of voltage pulses on DC power output 209 and conductor 216 during a time period 325. Thus, microprocessor 222 alternates between providing and not providing power to anodes 114 thereby alternating between increasing and decreasing a potential difference between the anodes and cathodes when starting the ion pump. In addition, each successive pulse in the sequence of voltage pulses on conductor 216 has a slightly greater voltage as the pressure in chamber 102 drops.

Eventually, at time point 321, the voltage on DC power output 209 does not drop below threshold voltage 321 when pulse switch 240 is closed. As a result, microprocessor 222 does not reopen pulse switch 240 after step 406 but instead leaves pulse switch 240 closed at step 412. This results in the voltage of DC power output 209 and conductor 216 slowly rising until the voltage reaches the target voltage at time 326.

In some embodiments, microprocessor 222 opens and closes switch 206 at regular intervals with the length of time pulse switch 240 is closed being equal to the length of time pulse switch 240 is open. In other embodiments, pulse switch 240 is open for a different amount of time than it is closed. In further embodiments, the amount of time pulse switch 240 is closed during each pulse changes over time. In accordance with the various embodiments, pulse switch 240 is closed for between 0.005 seconds and 2 seconds and pulse switch 240 is open for between 0.5 seconds and 2 seconds.

By applying voltage pulses at the startup of the ion pump, the present embodiments are able to limit or completely prevent the formation of plasmas within the ion pump and thereby reduce the amount of energy lost to heat when starting the ion pump. This is not only more efficient, it also helps to reduce damage to the ion pump due to excessive heat. Although the embodiments above describe applying voltage pulses during pump startup, in other embodiments, voltage pulses can be applied any time the voltage on DC power output 209 is below the threshold voltage 321.

In the discussion above, pulse switch 240 was located between high-voltage multiplier 214 and conductor 216. In another embodiment, pulse switch 240 is located between step-up transformer 208 and high-voltage multiplier 214. Moving pulse switch 240 to a position before high-voltage multiplier 214 results in pulse switch 240 operating at lower voltages, thereby decreasing the cost of pulse switch 240. However, placing pulse switch 240 before high-voltage multiplier 214 also increases the delay between the switching of pulse switch 240 and the resulting change in the voltage of conductor 216. In other embodiments, pulse switch 240 is located between switch 206 and step-up transformer 208. Again, this further reduces the voltage requirements for pulse switch 240, thereby reducing the costs of pulse switch 240 while further increasing the delay between switching and the change in voltage on conductor 216.

In the discussion above, cathode plates 116/118 were described as being at ground while anodes 114 were at a positive voltage. In other embodiments, anodes 114 are maintained at ground while a negative potential is applied to cathode plates 116/118 with each pulse. The choice of whether to apply a negative voltage to cathode plates 116/118 or a positive voltage to anodes 114 is a matter of design preference. Thus, the power may be applied to either cathode plates 116/118 or to anodes 114. Herein, regardless of the polarity of anodes 114 and cathode plates 116/118, the magnitude of the voltage between anodes 114 and cathode plates 116/118 is referred to as the potential difference between anodes 114 and cathode plates 116/118.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. An ion pump controller configured to alternate between increasing and decreasing a potential difference between an anode and a cathode of an ion pump multiple times during the starting of pumping, so as to limit formation of plasma in a pumping chamber of the ion pump while causing ions near the anode to move toward the cathode, wherein the ion pump controller is configured to alternate between increasing and decreasing the potential difference between the anode and cathode until a condition is met and then increases the potential difference between the anode and cathode until the potential difference between the anode and cathode reaches a target potential difference, the condition being whether the potential difference between the anode and the cathode is greater than a threshold.

2. The ion pump controller of claim 1 wherein each successive increase in the potential difference between the anode and the cathode results in a larger potential difference between the anode and the cathode than the previous increase in the potential difference.

3. The ion pump controller of claim 1 wherein the ion pump controller pauses between decreasing and increasing the potential difference.

4. The ion pump controller of claim 1 wherein the ion pump controller increases the potential difference by controlling a switch such that the switch closes and the ion pump controller decreases the potential difference by controlling the switch such that the switch opens.

5. A method of operating an ion pump, the method comprising:

increasing and decreasing a potential difference between an anode and a cathode of the ion pump;

determining that a state of the ion pump has changed; and in response to the change in the state, increasing the potential difference between the anode and the cathode to a target potential difference, wherein the increasing and decreasing the potential difference comprises applying voltage pulses between the anode and the cathode, so as to limit formation of plasma in the ion pump, wherein determining that a state of the ion pump has changed comprises determining that the potential difference between the anode and the cathode during a voltage pulse is above a threshold voltage.

6. The method of claim 5 wherein each voltage pulse is formed by closing a switch and then opening the switch.

7. The method of claim 6 wherein each voltage pulse provides a larger potential difference than all previous voltage pulses.

8. The method of claim 5 wherein each voltage pulse prevents a plasma from forming in the ion pump.

9. The method of claim 5 further comprising after decreasing the potential difference:

pausing for a period of time; and after pausing, increasing the potential difference between the anode and the cathode and then decreasing the potential difference between the anode and the cathode.

10. An ion pump controller configured to automatically alternate between providing power and not providing power to at least one of an anode and a cathode in an ion pump during startup of the ion pump, so as to limit formation of a plasma in the ion pump, wherein the ion pump controller is configured to determine a state of the ion pump and in response to the determined state stop alternating between providing power and not providing power and instead continuously provide power, the ion pump controller being configured to determine the state of the ion pump and by determining a voltage between the anode and the cathode when providing power, wherein the ion pump controller stops alternating between providing power and not providing power and instead continuously provides power in response to the voltage between the anode and the cathode becoming greater than a threshold.

11. The ion pump controller of claim 10 further configured to pause between not providing power and providing power for a time period less than two seconds.

12. The ion pump controller of claim 10 comprising a solid-state switch that provides power to the ion pump when closed and does not provide power to the ion pump when open.

* * * * *